United States Patent [19]

Kodama et al.

[11] Patent Number: 5,320,390
[45] Date of Patent: Jun. 14, 1994

[54] QUICK CONNECTOR

[75] Inventors: Tsutomu Kodama, Komaki; Hirokazu Kitamura, Kasugai; Toshihiro Kumagai, Tajimi; Kazuhiro Kato, Nagoya, all of Japan

[73] Assignee: Tokai Rubber Industries, Ltd., Komaki, Japan

[21] Appl. No.: 983,213

[22] Filed: Nov. 30, 1992

[30] Foreign Application Priority Data

Nov. 29, 1991 [JP] Japan .................................. 3-316914
Sep. 21, 1992 [JP] Japan .............................. 4-065616[U]

[51] Int. Cl.⁵ ............................................ F16L 37/084
[52] U.S. Cl. ..................... 285/308; 285/319; 285/921
[58] Field of Search ............... 285/319, 308, 307, 921

[56] References Cited

U.S. PATENT DOCUMENTS

| | | | |
|---|---|---|---|
| 4,645,246 | 2/1987 | Guest | 285/307 X |
| 4,836,580 | 6/1989 | Farrell | 285/319 X |
| 4,979,765 | 12/1990 | Bartholomew | 285/319 X |
| 5,042,848 | 8/1991 | Shiozaki | |
| 5,112,086 | 5/1992 | Gruber et al. | 285/319 X |
| 5,181,751 | 1/1993 | Kitamura | 285/308 X |
| 5,193,857 | 3/1993 | Kitamura | 285/319 |

FOREIGN PATENT DOCUMENTS 0280180 2/1988 European Pat. Off. .
41794 2/1989 Japan .
2240149 1/1991 United Kingdom .

Primary Examiner—Dave W. Arola
Attorney, Agent, or Firm—Jacobson, Price, Holman & Stern

[57] ABSTRACT

A quick connector includes a male member, a female member and an engager claw member. The male member includes a ring-shaped engager. The female member includes a receiver hole having an opening into which the male member is inserted, a ring-shaped stopper surface disposed oppositely to the opening, and a regulatory inner peripheral surface extending from the periphery of the stopper surface in an axial direction. The engager claw member disposed in the receiver hole of the female member, and it includes a ring-shaped base disposed movably in an axial direction, arms extending from the base to the opening in an axial direction and adapted for being elastically deformable in a radial direction, and a claw disposed so as to extend from each of the arms and adapted for engaging with the engager of the male member. In operation, the claws of the engager claw member are brought into contact with the stopper surface and engaged with the regulatory inner peripheral surface while they are engaged with the engager of the male member. Consequently, the male member in inhibited from displacing not only in an axial direction by the stopper surface, but also in a centrifugal direction by the regulatory inner peripheral surface. Thus, the engaging force associated with the claws is exerted securely, and accordingly the reliability of the quick connector in piping can be improved.

23 Claims, 15 Drawing Sheets

QUICK CONNECTOR

BACKGROUND OF THE INVENTION

1. Field of the Invention

The present invention relates to a quick connector for piping for connecting hoses or pipes which are employed to transfer a fluid, such as gasoline, oil, water, air and the like.

2. Description of the Prior Art

There has been a conventional quick connector which is disclosed in Japanese Unexamined Utility Model Publication (KOKAI) No. 41,794/1989, and which is illustrated in FIG. 24. This conventional quick connector comprises a tubular-shaped male member 100 which includes an inserting end portion 102 having a ring-shaped engager 101 with a tapered surface 101a provided, a tubular-shaped female member 200 which includes a receiver hole 202 having an opening 201, and an engager claw member 300 which is made of resin and retained in the receiver hole 202 of the female member 200. The female member 200 is provided with a window 204 which penetrates through the perpendicular wall in a thickness-wise direction, and a tapered surface 205 is formed in the peripheral wall which defines the window 204 on the side of the opening 201. The engager claw member 300 includes an arm 300 and a claw 303.

In the conventional quick connector, the inserting end portion 102 of the male member 100 is inserted into the receiver hole 202 of the female member 200 through the opening 201, thereby displacing the claw 303 of the engager claw member 300 in a centrifugal direction with the ring-shaped engager 101 of the male member 100. When the ring-shaped engager 101 gets over the claw 303, the claw 303 is engaged with a perpendicular surface 101b of the ring-shaped engager 101 by a restoring force resulting from the elasticity of the arm 302. Thus, the male member 100 and the female member 200 are connected with each other.

Further, there has been another conventional quick connector as illustrated in FIG. 25. In this conventional quick connector, a female member 200 is provided with a window 204 which penetrates through the peripheral wall in a thickness-wise direction, and a perpendicular surface 207 is formed in the peripheral wall which defines the window 204 on the side of an opening 201.

Furthermore, there has been still another conventional quick connector which is disclosed in U.S. Pat. No. 5,042,848, and which is illustrated in FIG. 26. This conventional quick connector utilizes an engager claw member 500 which is exposed to the outside of a female member 400. The engager claw member 500 includes a ring-shaped base 501 which is exposed to the outside, an arm 502 which extends from the base 501 in an axial direction, a claw 503 which is disposed at a free end of the arm 503 so as to extend therefrom, and an engager projection 504 which is disposed so as to extend from the claw 503 in a centrifugal direction. The female member 400 is provided with a stopper surface 403, and a regulatory inner peripheral surface 405 on the side of an opening 401. The regulatory inner peripheral surface 405 extends from the stopper surface 403 in an axial direction.

In this still another conventional quick connector, a groove-like ring-shaped engager 602 of a male member 600 is engaged with the claw 503, and at the same time the engager projection 504 is regulated by the regulatory inner peripheral surface 405 while it is brought into contact with the stopper surface 403. Thus, the male member 600 and the female member 400 are connected with each other.

As the conventional quick connector illustrated in FIG. 24 is used for a long time, the edge of the ring-shaped engager 101 of the male member 100 is rounded at the top of the tapered surface 101a. Accordingly, when a large force is applied to the male member 100 so as to come off the female member 200, a large force is applied to the claw 303 of the engager claw member 300 in the centrifugal direction, and thereby the engaging force associated with the claw 303 is deteriorated. Further, when the male member 100 is moved relatively to the female member 200 in a radial direction outwardly, i.e., in a direction of the arrow "M2" of FIG. 24, the claw 303 is pressed onto the tapered surface 205 by a peripheral wall 100c disposed in the rear of the ring-shaped engager 100, and there arises a fear that the claw 303 is displaced along the tapered surface 205 in a centrifugal direction, i.e., in a direction of the arrow "M1" of FIG. 24. If such is the case, the engaging force associated with the claw 303 is also deteriorated. All in all, the conventional quick connector is not fully reliable in piping.

Moreover, in the conventional quick connector illustrated in FIG. 24, the engager claw member 300 is not adapted that it can be moved in the female member 200 in the axial direction, i.e., in a direction of the arrow "X1." Accordingly, when connecting the male member 100 and the female member 200, namely when lifting the claw 303 with the tapered surface 101a of the ring-shaped engager 101 of the male member 100, the tapered surface 205 of the female member 200 interferes with the claws 303 being lifted. Hence, a large resistance is exerted when lifting the claw 303.

The another conventional quick connector illustrated in FIG. 25 also suffers from the same adverse situation as described above. Accordingly, there arise the problems that the another conventional quick connector is not fully reliable in piping, and that a large resistance is exerted when lifting the claw 303. In particular, as the another conventional quick connector illustrated in used for a long time, the perpendicular surface 207 of the window 204 is rounded at the edge 207a, and thereby the claw 303 becomes likely to come off. As a result, the engaging force associated with the claw 303 is deteriorated.

In the still another conventional quick connector illustrated in FIG. 26, since a greater portion of the engager claw member 500 is exposed to the outside of the female member 400, it is very likely to be brought into contact with other apparatuses or the like. When such a contact occurs, there arises a fear that the claw 502 disengages. Hence, the still another conventional quick connector is not fully reliable in piping, either.

The present invention has been developed in view of the aforementioned circumstances. It is therefore an object of the present invention to provide a quick connector in which the engaging force associated with a claw of an engager claw member is exerted firmly, and whose reliability in piping is enhanced.

SUMMARY OF THE INVENTION

A quick connector according to the present invention comprises:

a tubular-shaped male member including an inserting end portion having a leading end and a ring-shaped engager disposed in the rear of the leading end;

a tubular-shaped female member including a receiver hole having an opening into which the inserting end portion and the ring-shaped engager of the male member are inserted, a ring-shaped stopper surface disposed oppositely to the opening, and a regulatory inner peripheral surface extending in an axial direction, the ring-shaped stopper surface and the regulatory inner peripheral surface adapted for defining the receiver hole and formed in this order away from the opening to the inner side; and an engager claw member disposed in the receiver hole of the female member, and including a ring-shaped base disposed movably in an axial direction and intervening between an inner peripheral surface constituting the receiver hole of the female member and an outer peripheral surface of the inserting end portion of the male member inserted into the receiver hole, a plurality of arms extending from the base to the opening in an axial direction of the female member substantially and adapted for being elastically deformable in a radial direction, and a claw disposed so as to extend from each of the arms and adapted for engaging with the ring-shaped engager of the male member;

wherein the claws of the engager claw member is pressed onto the ring-shaped stopper surface of the female member by moving the engager claw member to the opening of the female member in an axial direction of the female member while regulating centrifugal movements of the claws of the engager claw member with the regulatory inner peripheral surface of the female member, thereby engaging the claws of the engager claw member with the ring-shaped engager of the inserting end portion of the male member.

The operation of the present quick connector will be hereinafter described together with the usage thereof. When connecting the male member and the female member, the inserting end portion of the male member is inserted into the receiver hole of the female member through the opening. As the inserting end portion is inserted, the arms and the claws of the engager claw member are lifted. When the inserting end portion is inserted to an engagement position, the claws of the engagement claw member and the ring-shaped engager of the male member engage with each other. Since the claws and the ring-shaped engager are engaged, the engager claw member is moved together with the male member in the axial direction of the female member when the male member is moved relatively in the axial direction away from the female member. Accordingly, the claws are engaged with the regulatory inner peripheral surface of the female member, and then they are brought into contact with the ring-shaped stopper surface. As a result, the claws are inhibited from displacing in the axial direction by the stopper surface. At the same time, since the claws are also engaged with the regulatory inner peripheral surface of the female member which is placed on the radially outer side of the claws, they are further inhibited from displacing in the centrifugal directions. Thus, the claws of the engager claw member are inhibited from coming off the ring-shaped engager of the male member.

In accordance with the present quick connector, the claws of the engager claw member are brought into contact with the ring-shaped stopper surface of the female member while they are engaged with the ring-shaped engager of the male member. Consequently, the male member is inhibited from displacing in the axial direction. At the same time, the claws are further inhibited from displacing in the centrifugal directions by the regulatory inner peripheral surface of the female member. Thus, the claws of the engager claw member are inhibited from coming off the ring-shaped engager of the male member. All in all, the engaging force associated with the claws is exerted securely, and accordingly it is possible to improve the reliability of the present quick connector in piping.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for purposes of illustration only and are not intended to limit the scope of the appended claims.

First Preferred Embodiment

Figure 1:
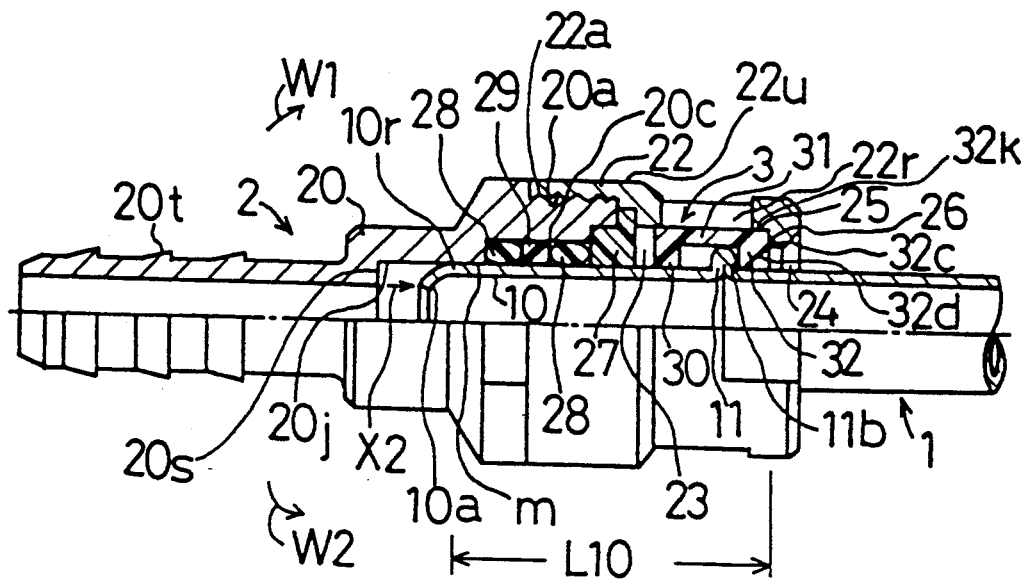
FIG. 1 is a fragmentary longitudinal cross sectional view which illustrates a First Preferred Embodiment of the present quick connector with a male member and a female member connected and whose upper half is illustrated in cross section.
Figure 2:
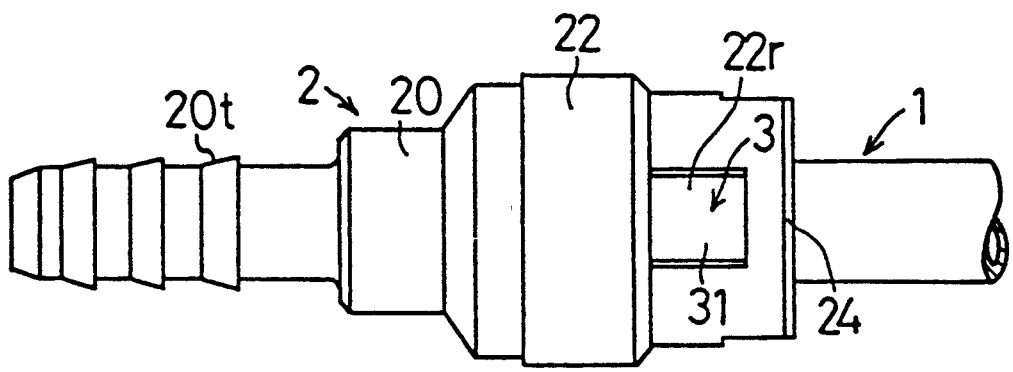
FIG. 2 is a plan view of the First Preferred Embodiment with the male member and the female member connected.
Figure 3:
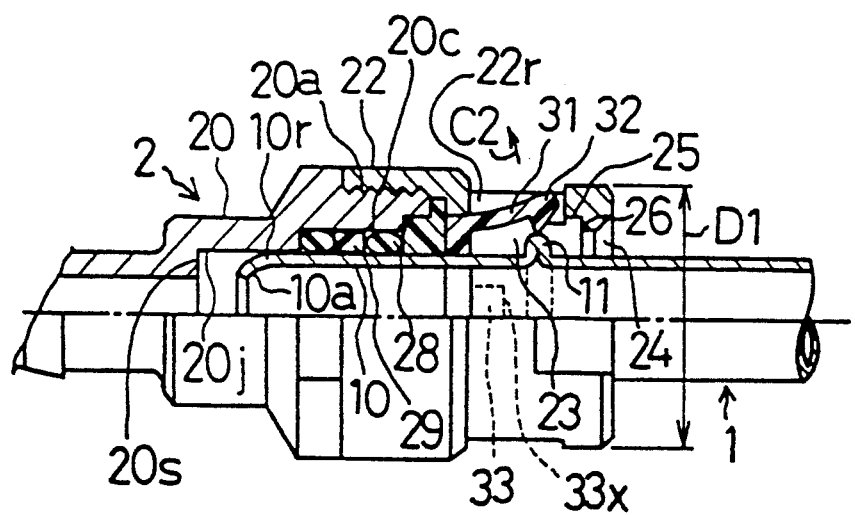
FIG. 3 is a fragmentary longitudinal cross sectional view which illustrates the First Preferred Embodiment with the male member being inserted into the male member and whose upper half is illustrated in cross section.
Figure 4:
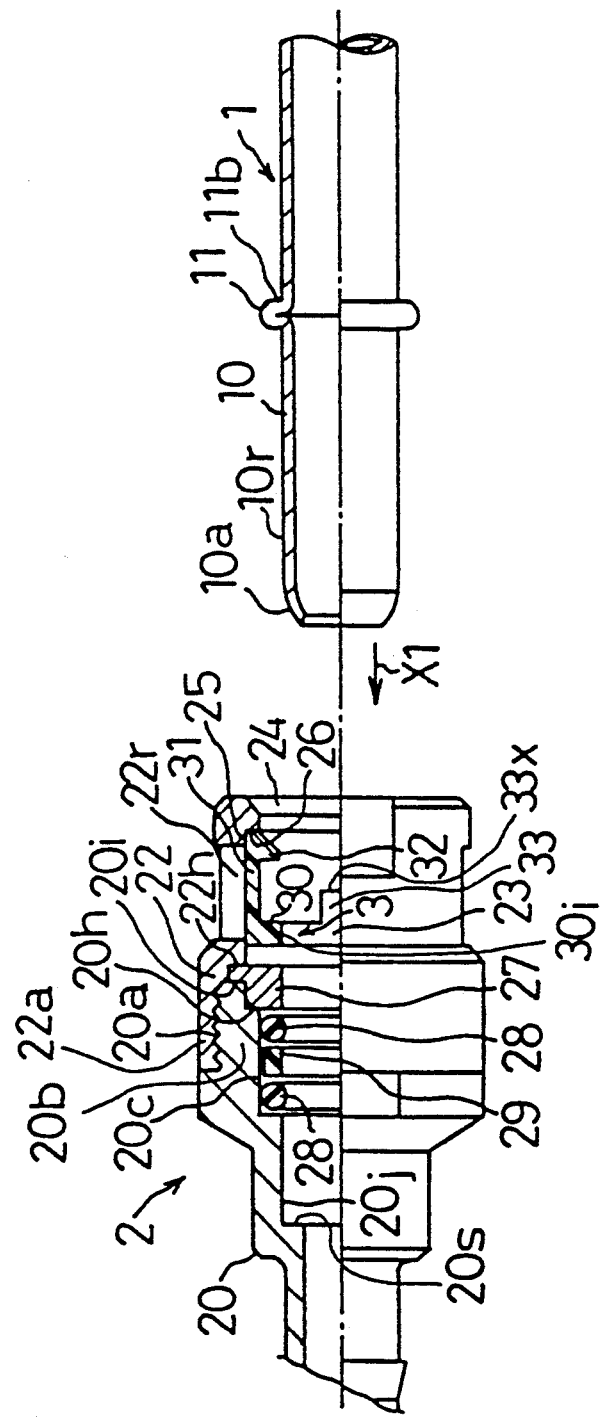
FIG. 4 is a fragmentary longitudinal cross sectional view which illustrates the First Preferred Embodiment prior to the insertion of the male member into the female member and whose upper half is illustrated in cross section.

The First Preferred Embodiment of the present quick connector will be hereinafter described with reference to FIGS. 1 through 7. In particular, FIG. 1 is a fragmentary longitudinal cross sectional view which illustrates the quick connector completed in the connection, FIG. 2 is a plan view of the quick connector, FIG. 3 is a fragmentary longitudinal cross sectional view which illustrates the quick connector in the process of the connection, and FIG. 4 is a fragmentary longitudinal cross sectional view which illustrates the quick connector prior to the connection.

Construction

As illustrated in FIGS. 1 through 4, the First Preferred Embodiment of the present quick connector comprises a male member 1, a female member 2 and an engager claw member 3.

The male member 1 includes an inserting end portion 10 made of a thin-walled metallic pipe. The inserting end portion 10 has a leading end 10r and a ring-shaped projection 11 which is disposed in the rear of the leading end 10r so as to project in a centrifugal (or radial) direction. The ring-shaped projection 11 is formed by increasing the diameter of the peripheral wall of the inserting end portion 10. Further, a cone-shaped guiding portion 10a is formed at the leading end 10r of the inserting end portion 10 so as to ease the insertion of the inserting end portion 10.

The female member 2 includes a first socket 22 which has a female thread portion 22a and a second socket 20 which has a male thread portion 20a. The first socket 22 and the second socket 20 are connected detachably by screwing the female thread portion 22a and the male thread portion 20a.

The first socket 22 has a cylinder-shaped receiver hole 23 which has a circle-shaped opening 24, and a relief space 22r which penetrates through a peripheral wall of the first socket 22. Further, in the first socket 22, there is formed a ring-shaped regulatory peripheral surface 25 extending in an axial direction in an inner peripheral surface on the side of the opening 24. Furthermore, between the regulatory inner peripheral surface 25 and the opening 24, there is formed a ring-shaped stopper surface 26 so as to oppose to the opening 24. The stopper surface 26 is formed so as to extend in a direction perpendicular to the axial direction, i.e., it is formed perpendicularly.

In the second socket 2C, there are formed ring-shaped holding surfaces 20h and 20i as illustrated in FIG. 4. In the first socket 22, there is formed a ring-shaped holding surface 22h. A ring-shaped busing 27 is held by the holding surfaces 20h and 20i as well as the holding surface 22h. Further, in the second socket 20, there are formed a sealing groove 20t (shown in FIG. 1), a sealing inner peripheral surface 20c which has an inside diameter larger than the outside diameter of the inserting end portion 10 of the male member 1, and an engaging inner peripheral surface 20j having an inside diameter equal to the outside diameter of the inserting end portion 10. The sealing inner peripheral surface 20c is provided with a pair of O-rings 28, 28 working as a sealing member and a ring-shaped collar 29 disposed between the O-rings 28, 28.

Figure 6:
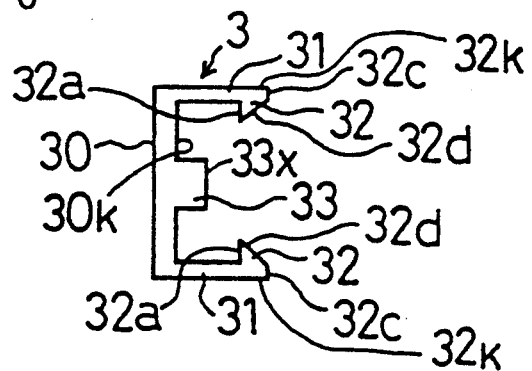
FIG. 6 is a side view of the engager claw member of the First Preferred Embodiment.
Figure 7:
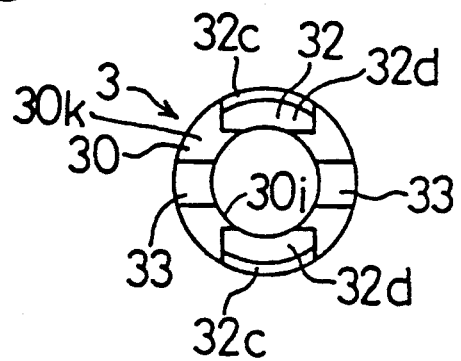
FIG. 7 is a front view of the engager claw member of the First Preferred Embodiment.

FIGS. 6 and 7 illustrate the engager claw member 3. The engager claw member 3 is made of resin, and it includes a ring-shaped base 30 having a central hole 30*i*, a pair of arms 31, 31 elastically deformable, a pair of claws 32, 32 disposed so as to extend from each of the free ends of the arms 31, 31, and a pair of projections 33, 33 disposed on the base 30 so as to extend to the opening 24 of the first socket 22. The base 30 is disposed in the receiver hole 23 of the first socket 22, and it can be moved in the axial direction of the first socket 22. The arms 31, 31 are formed like a fork so as to extend from an axial end surface 30*k* of the ring-shaped base 30 to the opening 24 of the first socket 22 in the axial direction substantially. The claws 32, 32 are disposed so as to extend from each of the free ends of the arms 31, 31. As illustrated in FIG. 6, each of the claws 31, 31 includes an engaging surface 32*a* disposed substantially perpendicularly to the axial direction, a tapered surface 32*d* inclined with respect to the axial direction, and a contact surface 32*c* disposed substantially perpendicularly to the axial direction. Further, as illustrated in FIG. 4, an outside diameter of the engager claw member 3 is equal to the inside diameter of the receiver hole 23 of the female member 2. Furthermore, the engager claw member 3 is disposed in the receiver hole 23 of the female member 2, and accordingly it is not exposed to the outside of the female member 2.

Operation

The connection procedure of the First Preferred Embodiment of the present quick connector will be hereinafter described together with the operation thereof. First of all, the present quick connector is put into a state as illustrated in FIG. 4, and the inserting end portion 10 of the male member 1 is moved relatively in a direction of the a arrow "X1," and it is inserted into the receiver hole 23 through the opening 24 of the first socket 22 of the female member 2. Then, as illustrated in FIG. 3, the engager claw member 3 is retracted so as to bring the base 30 into contact with an axial end surface of the bushing 27, and the leading end 10*r* of the inserting end portion 10 is engaged with the engaging inner peripheral surface 20*j* of the female member 2. During the retraction of the engager claw member 3, the claw 32 is lifted up by the ring-shaped projection 11 of the inserting end portion 10 as illustrated in FIG. 3, and the arm 32 is flexed in a centrifugal direction, i.e., in a direction of the arrow "C2." Accordingly, the flexed claw 32 is relived into the relief space 22*r* as illustrated in FIG. 3. When the insertion is carried out further and the ring-shaped projection 11 gets over the claw 32, the arm 31 and the claw 32 are restored by their own elastic forces in a centripetal direction, i.e., in a direction of the arrow "C1" as illustrated in FIG. 5, and accordingly the claw 32 is engaged with the ring-shaped projection 11 of the male member 1.

After the connection and when an internal pressure is applied to the leading end surface of the female member 2 or when the male member 1 is pulled in the service, the male member 1 is moved relatively in the direction of the arrow "X2," and the ring-shape projection 10 of the male member 1 is also moved in the same direction. Accordingly, the claw 32 is pressed by the ring-shaped projection 11 in the same direction, the engager claw member 3 is moved to the opening 24 in the axial direction of the female member 2, and the claw 32 is accommodated in the space enclosed by the regulatory inner peripheral surface 25 and engaged therewith. Further, as illustrated in FIG. 1, the contact surface 32*c* of the claw 32 of the engager claw member 3 is pressed onto the stopper surface 26, and accordingly the claw 32 and the male member 1 are inhibited from displacing in the axial direction. At the same time, as illustrated in FIG. 1, since a head surface 32*k* of the claw 32 of the engager claw member 3 is placed inside the regulatory inner peripheral surface 25 and engaged therewith, the claw 32 is inhibited from displacing in the centrifugal direction by the regulatory inner peripheral surface 25. As a result, the claw 31 cannot be detached in the centrifugal direction. Hence, the engaging force associated with the claw 32 is exerted securely, and accordingly the reliability of the present quick connector is secured in piping.

Figure 5:
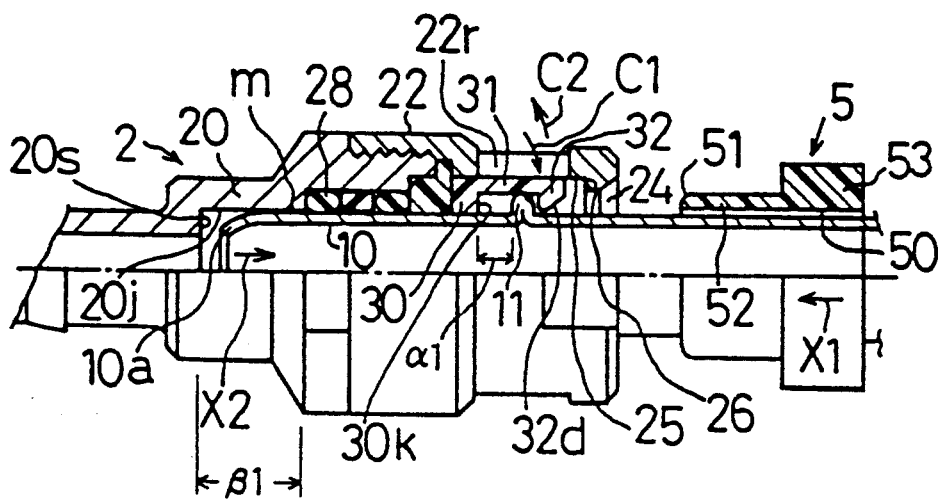
FIG. 5 is a fragmentary longitudinal cross sectional view which illustrates the First Preferred Embodiment with a claw of an engager claw member being disengaged and whose upper half is illustrated in cross section.

In order to release the connection between the male member 1 and the female member 2, it is possible to use a claw disengaging jig 5 as illustrated in FIG. 5. The claw disengaging jig 5 includes a tubular portion 52 having a central hole 50 and a tapered contact surface 51 at the leading end, and a flanged portion 53 disposed on an outer peripheral surface of the tubular portion 52 so as to extend therefrom. The inserting end portion 10 of the male member 1 is inserted into the central hole 50. As illustrated in FIG. 5, the male member 1 is pressed toward the female member 2 in the direction of the arrow "X1," and the engager claw member 3 is retracted also in the direction of the arrow "X1," thereby facing the claw 32 to the relief space 22*r*. While maintaining the state, the leading end of the tubular portion 52 of the claw disengaging jig 5 is pressed into the opening 24 of the first socket 22, and the tapered contact surface 51 of the claw disengaging jig 5 is pressed onto the engager claw member 3 at the tapered surface 32*d* of the claw 32. As a result, the arm 31 of the engager claw member 3 is flexed, and at the same time the claw 32 is lifted up in the centrifugal direction, i.e., in the direction of the arrow "C2," so that it is disengaged from the ring-shaped projection 10 of the male member 1. While maintaining the thusly disengaged state, the male member 1 and the female member 2 can be separated with ease and in a short period of time by pulling apart the inserting end portion 10 of the male member 1 and the second socket 20 in the axial directions.

Advantageous Effect

As having been described so far, in the First Preferred Embodiment of the present quick connector, the engager claw member 3 is moved in the axial direction of the female member 2 while the male member 1 is inserted into the opening 24 of the female member 2, and thereby the claws 32 of the engager claw member 3 are pressed onto the stopper surface 26 of the female member 2. Accordingly, the claws 32 are inhibited from displacing in the axial direction. At the same time, the claws 32 of the engager claw member 3 are engaged with the regulatory inner peripheral surface 25 of the female member 2, and thereby the claws 32 are inhibited from displacing in the centrifugal directions. Accordingly, the claws 32 of the engager claw member 3 are inhibited from disengaging from the ring-shaped projection 32 of the male member 1. All in all, the engaging force associated with the claws 32 is maintained being high, and accordingly the male member 1 and the female member 2 are connected each other with high reliability.

During the service, an internal pressure is applied in a direction pressing the inserting end portion 10 of the male member 1, i.e., in the direction of the arrow "X2" of FIG. 1. Consequently, a rear surface 11b of the ring-shaped projection of the inserting end portion 10 urges the claws 32 of the engager claw member 3. Hence, the engaging force associated with the claws 32 is exerted further securely.

Further, in the First Preferred Embodiment of the present quick connector, the outside diameter of the leading end 10r of the inserting end portion 10 of the male member 1 is substantially equal to the inside diameter of the engaging inner peripheral surface 20j of the female member 2 as can be appreciated from FIG. 1. Accordingly, when the leading end 10r of the inserting end portion 10 of the male member 1 is engaged with the engaging inner peripheral surface 20j, the leading end 10r is inhibited from being "rickety" in a direction perpendicular to the axial direction. In addition, since the claws 32 of the engager claw member 32 are engaged with the regulatory inner peripheral surface 25, the ring-shaped projection 11 is also inhibited from being "rickety" in a direction perpendicular to the axial direction. Thus, a "rickety" state inhibiting distance falls in a range which is designated with "$L_{10}$" in FIG. 1, and it is provided over a long distance. Hence, the male member 1 and the female member 2 are inhibited from being "rickety" in directions swinging them, i.e., in the directions of the arrows "W1" and "W2."

By the way, the internal pressure applied to the female member 2 might be applied to the O-ring 28 by way of a fine space "m" between the leading end 10r of the inserting end portion 10 of the male member 1 and the engaging inner peripheral surface 20j of the female member 2, and accordingly the O-ring 28 is displaced slidingly in the axial direction and eventually the engager claw member 3 might be adversely affected by the internal pressure. If such is the case, there arises a fear that the arms 31 of the engager claw member 3 might be deformed so that the engaging force associated with the claws 32 might be weakened. However, in the First Preferred Embodiment of the present quick connector, the ring-shaped bushing 27 is held and fixed by the second socket 20 and the first socket 22. As a result, even if the O-ring 28 is subjected to the internal pressure applied to the female member 2 and it is displaced slidingly in the axial direction, it is inhibited from displacing by the bushing 27. Hence, and thereby the internal pressure is prevented from adversely affecting the engaging force associated with the claws 32.

Furthermore, in the First Preferred Embodiment of the present quick connector, there is formed the relief space 22r in the peripheral wall of the first socket 22. Therefore, as illustrated in FIG. 3, when the ring-shaped projection 11 of the inserting end portion 10 of the male member 1 gets over the claw 32 of the engager claw member 3, the claw 32 and the arm 31 are pressed and expanded in the centrifugal direction, i.e., in the direction of the arrow "C2," but they are relieved in the relief space 22r without being interfered with the peripheral wall of the first socket 22. Accordingly, the construction is advantageous for down-sizing the dimension of the outside diameter "D1." In addition, when the male member 1 and the female member 2 are connected, in the First Preferred Embodiment, the engager claw member 3 is placed inwardly with respect to the outer peripheral surface 22u of the first socket 22 so that the external apparatuses or the like are advantageously inhibited from reaching the claw 32.

Moreover, in the First Preferred Embodiment of the present quick connector, it is preferable to set an axial length of the arms 31 of the engager claw member 3 at a predetermined length or more in order to optimize an inserting load while inserting the male member 1 into the female member 2. However, the larger the axial length of the arms 31 of the engager claw member 3 is set, the larger an inserting distance during the insertion of the male member 1 into the female member 2 is increased by the axial length of the arms 31. In other words, as illustrated in FIG. 5, the male member 1 is inserted into the female member 2 excessively by a distance "$\alpha1$" until the ring-shaped projection 11 is brought into contact with the axial end surface 30k of the base 30 of the engager claw member 3. The larger the axial length of the arms 31 is set, the longer the distance "$\alpha1$" is increased. When the distance "$\alpha1$" is set longer, it is necessary to set an axial length "$\beta1$" of the engaging inner peripheral surface 20j of the female member 2 larger in order to inhibit the guiding portion 10a of the male member 1 from colliding with an end surface 20s of the female member 2 during the insertion of the male member 1 into the female member 2. Accordingly, it is inevitable that the present quick connector is enlarged in the axial direction. However, in the First Preferred Embodiment, a pair of projections 33, 33 are disposed on the base 30 of the engager claw member 3 so as to project therefrom, and the ring-shaped projection 10 of the male member 1 is brought into contact with an end surface 33x of the projection 33 as can be understood from FIGS. 5 through 7. Namely, the ring-shaped projection 11 is brought into contact with the end surface 33x of the projections 33, 33 immediately after it gets over the claws 32, and accordingly the inserting end portion 10 of the male member 1 is inhibited from being excessively inserted into the female member 2. As a result, the present quick connector is inhibited from enlarging in the axial direction.

Second Preferred Embodiment

Figure 8:
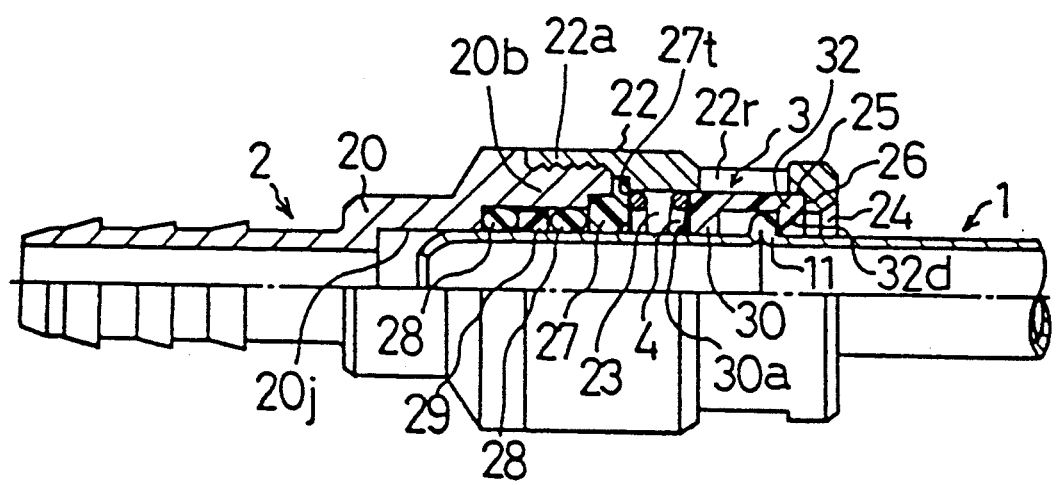
FIG. 8 is a fragmentary longitudinal cross sectional view which illustrates a Second Preferred Embodiment of the present quick connector with a male member and a female member connected and whose upper half is illustrated in cross section.

The Second Preferred Embodiment of the present quick connector will be hereinafter described with reference to FIG. 8. The Second Preferred Embodiment has the same construction as that of the First Preferred Embodiment basically, and the component parts working similarly will be hereinafter described with the same reference numbers. However, in the Second Preferred Embodiment, the first socket 22 further includes a spring 4 disposed therein. The spring 4 is a metallic coil spring, it is placed in the receiver hole 23 of the first socket 22, and it is held between a seating surface 27t of the bushing 27 and the spring seating surface 30a of the base 30 of the engager claw member 3. The spring 4 urges the engager claw member 3 to the opening 24 of the first socket 22 in the axial direction of the first socket 22, and thereby the claws 32 of the engager claw member 3 are pressed onto the stopper surface 26 of the first socket 22 while regulating the claws 32 with the regulatory inner peripheral surface 25 of the first socket 22.

Third Preferred Embodiment

Figure 9:
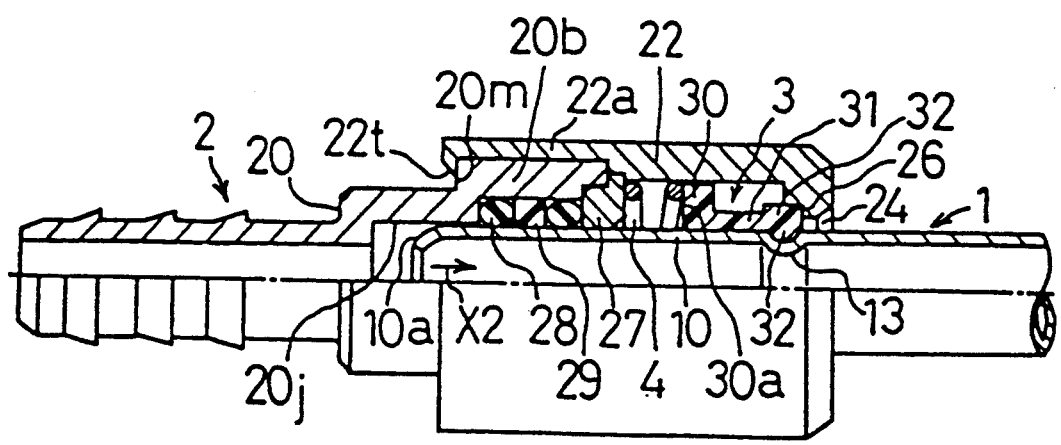
FIG. 9 is a fragmentary longitudinal cross sectional view which illustrates a Third Preferred Embodiment of the present quick connector with a male member and a female member connected and whose upper half is illustrated in cross section.

The Third Preferred Embodiment of the present quick connector will be hereinafter described with reference to FIG. 9. The Third Preferred Embodiment has the same construction as that of the Second Preferred Embodiment basically, and the component parts working similarly will be hereinafter described with the same reference numbers. However, in the Third Preferred Embodiment, there is formed a ring-shaped engager 13 in a groove shape at the inserting end portion 10 of the male member 1. Further, there is formed an engager projection 22t at the leading end (i.e., the right-hand side end in the drawing) of the peripheral wall of the first socket 22, and thereby the first socket 22 and the second socket 20 are connected by engager the engaging projection 22t with an vertical wall of the second socket 20.

Fourth Preferred Embodiment

Figure 10:
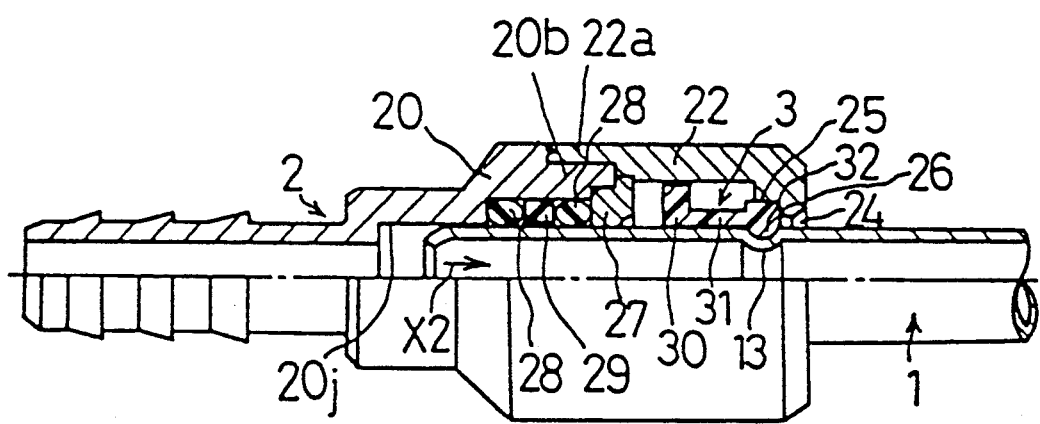
FIG. 10 is a fragmentary longitudinal cross sectional view which illustrates a Fourth Preferred Embodiment of the present quick connector with a male member and a female member connected and whose upper half is illustrated in cross section.

The Fourth Preferred Embodiment of the present quick connector will be hereinafter described with reference to FIG. 10. The Fourth Preferred Embodiment has the same construction as that of the Third Preferred Embodiment illustrated in FIG. 9 basically, and the component parts working similarly will be hereinafter described with the same reference numbers. However, the Fourth Preferred Embodiment is not provided with the spring 4. The male member 1 and the engager claw member 3 are moved in the direction of the arrow "X2" by the internal pressure applied to the female member 2, and thereby the engager claw member 3 is moved to the opening 24 of the first socket 22. In addition, the first first socket 22 and the second socket 20 are connected by melting.

Fifth Preferred Embodiment

Figure 11:
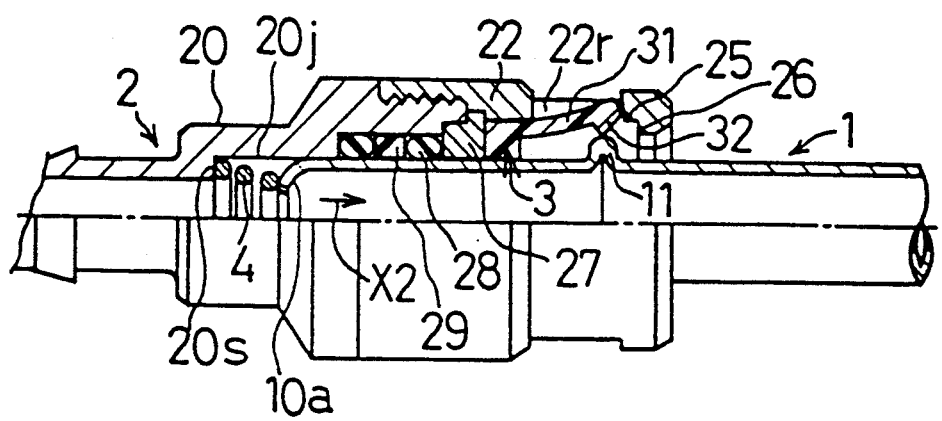
FIG. 11 is a fragmentary longitudinal cross sectional view which illustrates a Fifth Preferred Embodiment of the present quick connector with a male member being inserted into a male member and whose upper half is illustrated in cross section.
Figure 12:
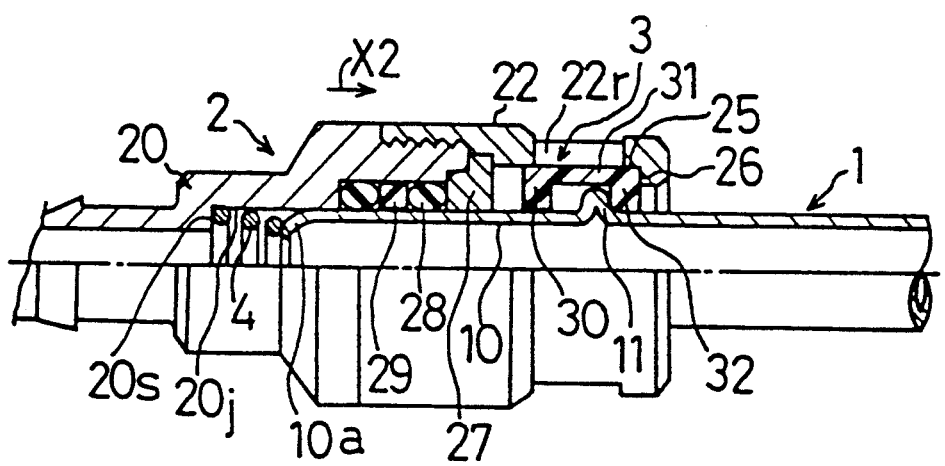
FIG. 12 is a fragmentary longitudinal cross sectional view which illustrates the Fifth Preferred Embodiment with the male member and the female member connected and whose upper half is illustrated in cross section.

The Fifth Preferred Embodiment of the present quick connector will be hereinafter described with reference to FIGS. 11 and 12. The Fifth Preferred Embodiment has the same construction as that of the First Preferred Embodiment basically, and the component parts working similarly will be hereinafter described with the same reference numbers. However, in the Fifth Preferred Embodiment, a spring 4 is disposed on the end surface 20s and the engaging inner peripheral surface 20j of the second socket 20. When the male member 1 is inserted, the spring 4 presses and urges the guiding portion 10a of the male member 1 so as to move the male member 1 and the engager claw member 3 in the direction of the arrow "X2," and thereby the claws 32 of the engager claw member 3 are pressed onto the stopper surface 26 of the first socket 22 while regulating the claws 32 with the regulatory inner peripheral surface 25 of the first socket 22.

Sixth Preferred Embodiment

Figure 13:
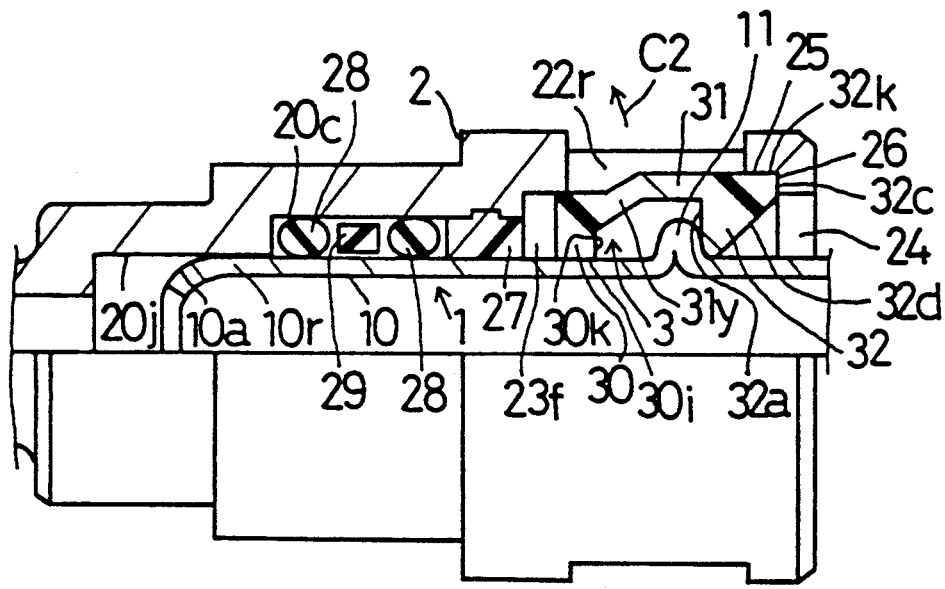
FIG. 13 is an enlarged fragmentary longitudinal cross sectional view which illustrates a major portion of a Sixth Preferred Embodiment of the present quick connector with a male member and a female member connected and whose upper half is illustrated in cross section.

The Sixth Preferred Embodiment of the present quick connector will be hereinafter described with reference to FIG. 13. The Sixth Preferred Embodiment has the same construction as that of the First Preferred Embodiment basically. However, in the Sixth Preferred Embodiment, there is formed a bendable portion 31y at each of the fixed end of the arms 31 of the engager claw member 3 so as to make the arms 32 more likely to bend in the centrifugal directions.

Seventh Preferred Embodiment

Figure 14:
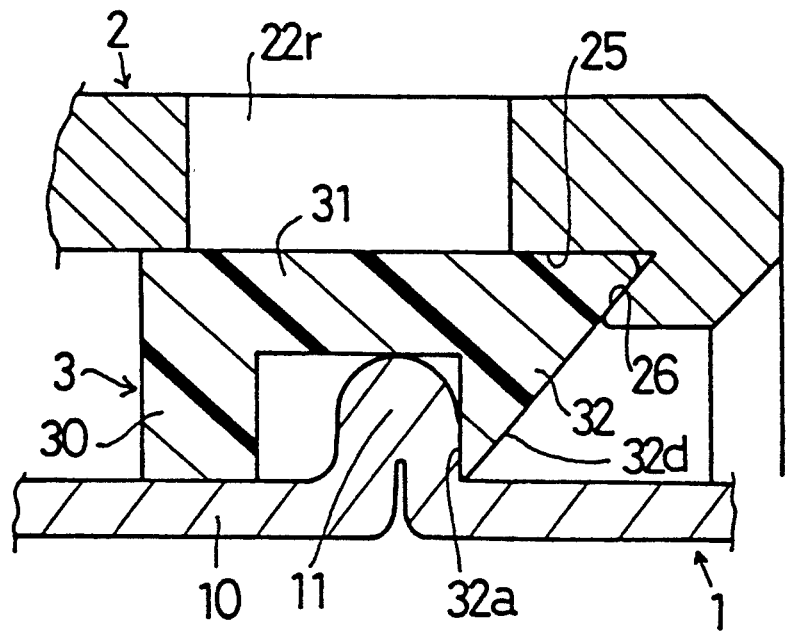
FIG. 14 is an enlarged longitudinal cross sectional view which illustrates a major portion of a female member of the Seventh Preferred Embodiment of the present quick connector.

The Seventh Preferred Embodiment of the present quick connector will be hereinafter described with reference to FIG. 14. In the Seventh Preferred Embodiment, the stopper surface 26 of the female member 2 is formed so that it inclines in a direction away from the opening 24.

Eighth Preferred Embodiment

Figure 15:
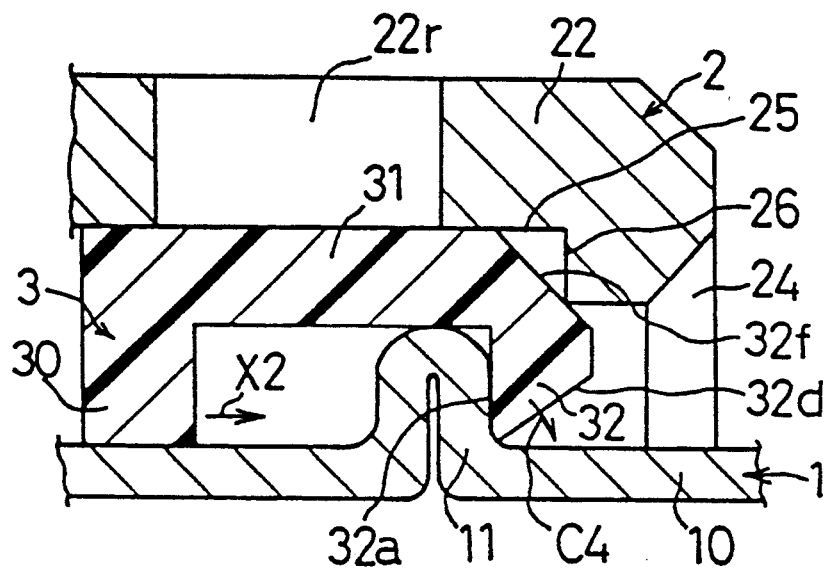
FIG. 15 is an enlarged longitudinal cross sectional view which illustrates a major portion of a female member of an Eighth Preferred Embodiment of the present quick connector.

The Eighth Preferred Embodiment of the present quick connector will be hereinafter described with reference to FIG. 15. In the Eighth Preferred Embodiment, there is formed a tapered surface 32f in each of the claws 32 of the engager claw member 3. Accordingly, when the engager claw member 3 is moved in the direction of the arrow "X2," the tapered surface 32f is pressed onto the stopper surface 26 of the female member 2 at the radially internal peripheral edge, and thereby the claw 32 is urged in a direction of the arrow "C4." As a result, it is expected that the engaging force exerted between the claw 32 and the ring-shaped projection 11 of the male member 1 is enhanced advantageously.

Ninth Preferred Embodiment

Figure 16:
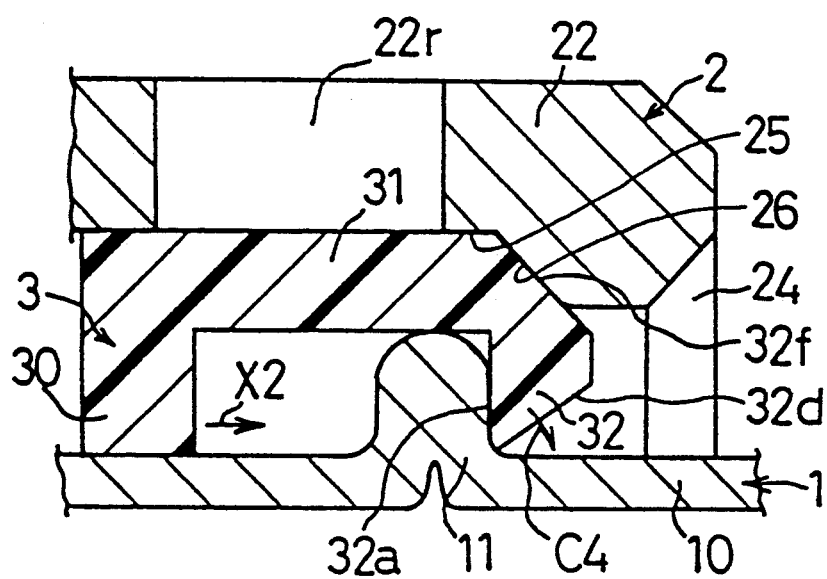
FIG. 16 is an enlarged longitudinal cross sectional view which illustrates a major portion of a female member of a Ninth Preferred Embodiment of the present quick connector.
Figure 17:
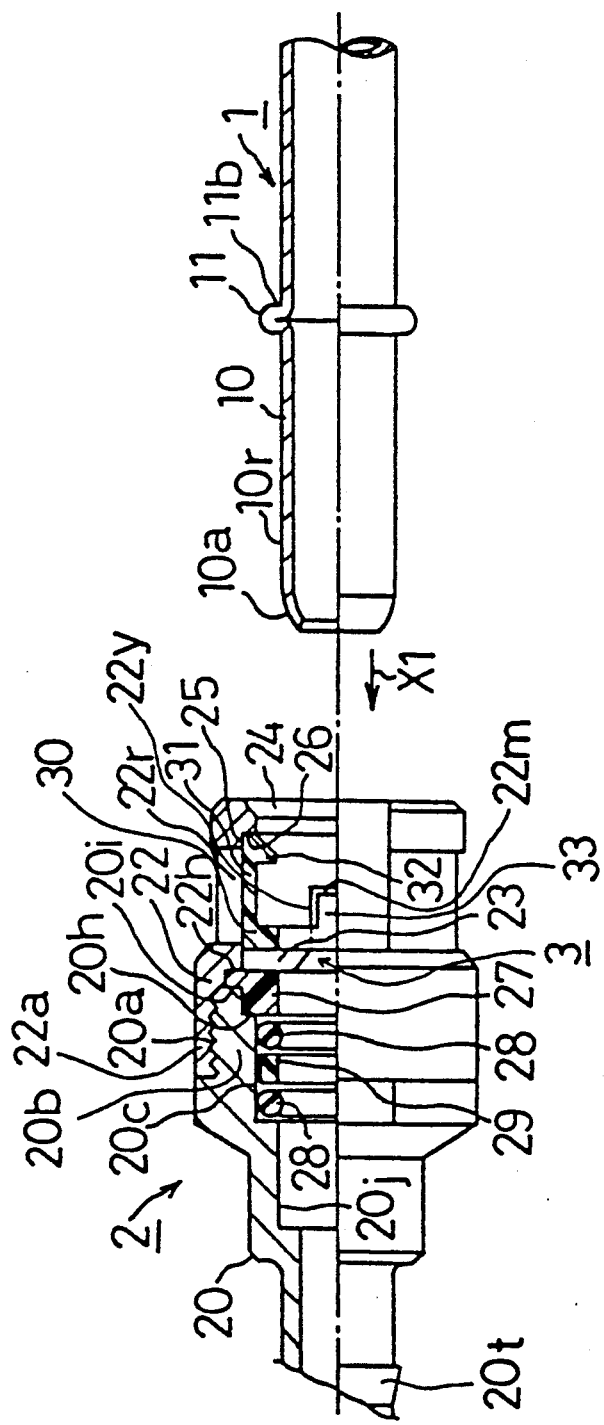
FIG. 17 is a fragmentary longitudinal cross sectional view which illustrates a Tenth Preferred Embodiment of the present quick connector prior to the insertion of a male member into a female member and whose upper half is illustrated in cross section.
Figure 18:
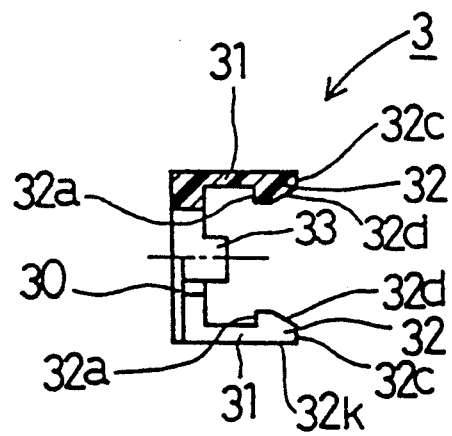
FIG. 18 is a fragmentary longitudinal cross sectional view which illustrates an engager claw member of the Tenth Preferred Embodiment and whose upper half is illustrated in cross section.

The Ninth Preferred Embodiment of the present quick connector will be hereinafter described with reference to FIG. 16. In the Ninth Preferred Embodiment, the stopper surface 26 of the female member 2 is formed in a tapered shape which reduces its inside diameter as it approaches to the opening 24, and it is disposed so as to face to the tapered surface 32f of the claw 32 of the engager claw member 3.

Tenth Preferred Embodiment

The Tenth Preferred Embodiment of the present quick connector will be hereinafter described with reference to FIGS. 17 through 21. The Tenth Preferred Embodiment has the same construction as that of the First Preferred Embodiment basically. However, in the Tenth Preferred Embodiment, there are formed a pair of whirl-stop engages 22m, 22m in the inner peripheral surface of the first socket 22. Each of the whirl-stop engages 22m, 22m is formed in a concaved shape, and it extends from the leading end of the receiver hole 23 to the opening 24.

Figure 19:
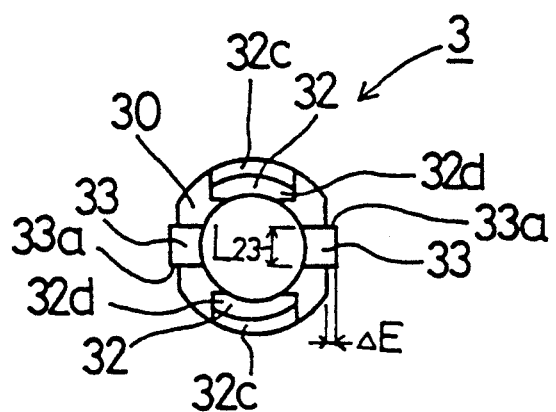
FIG. 19 is a front view of the engager claw member of the Tenth Preferred Embodiment.
Figure 20:
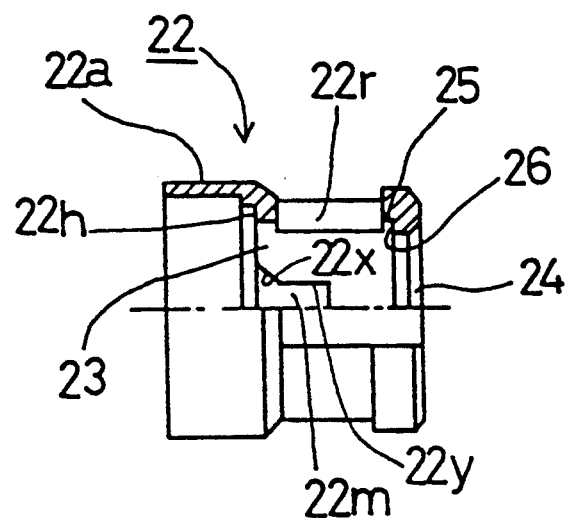
FIG. 20 is a fragmentary longitudinal cross sectional view which illustrates the female member of the Tenth Preferred Embodiment and whose upper half is illustrated in cross section.
Figure 21:
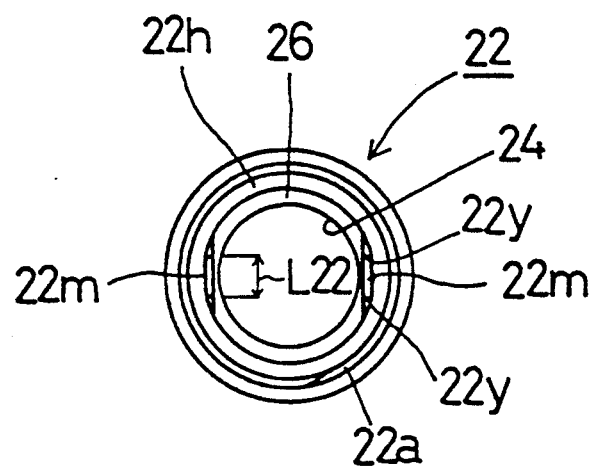
FIG. 21 is a front view of the female member of the Tenth Preferred Embodiment.

As illustrated FIG. 20, the whirl-stop engagee 22m includes a cone portion 22x which extends from the leading end of the receiver hole 23 to the opening 24 while reducing its width, and a rectangular portion 22y which extends in the direction with a constant width. As illustrated in FIG. 21, there are formed a pair of the whirl-stop engagees 22m, 22m in the inner peripheral surface of the first socket 22 symmetrically in the diameter direction. The width "$L_{22}$" of the rectangular portion 22y is set so that it is slightly larger than a width "$L_{23}$" of the projection 33 (see FIG. 19.) which is formed on the end surface of the base 30 of the engager claw member 3.

As illustrated in FIG. 19, each of the projections 33 of the engager claw member 3 has a convexed shaped whirl-stop engager 33a which is formed so as to extend in a centrifugal direction of the base 30 by "$\Delta E$" and which engages with each of the concaved shape whirl-stop engages 22m, 22m. Thus, the engager claw member 3 and the male member 2 are inhibited from relatively displacing in the circumferential directions. Therefore, the engaging force associated with the claws 32 is exerted securely by the construction. It goes without saying that the whirl-stop engagers 33a, 33a can be formed in a concaved shape which dents radially inwardly and the whirl-stop engagees 22m, 22m can be formed in a convexed shape.

Eleventh Preferred Embodiment

The Eleventh Preferred Embodiment of the present quick connector will be hereinafter described with reference to FIG. 22. The Eleventh Preferred Embodiment optimizes the insertability of the male member 1 into the female member 2 and the removability of the male member 1 from the female member 2 in the First Preferred Embodiment.

Qualitatively speaking, the insertability of the male member 1 into the female member 2 has an operator who connects the present quick connector perceive a proper resistance force which is applied to the ring-shaped projection 11 of the male member 1 by the claws 32 of the engager claw member 3 when the claws 32 of the engager claw member 3 get over the ring-shaped projection 11 of the male member 1, and the proper resistance force which is reduced sharply thereafter so as to indicate the completion of the inserting operation of the male member 1 into the female member 2. The removability of the male member 1 from the female member 2 is a force which is required to remove the male member 1 from the female member 2 and which needs to be a predetermined value or more in order to put the present quick connector into actual applications.

In the Eleventh Preferred Embodiment as illustrated in

Figure 22:
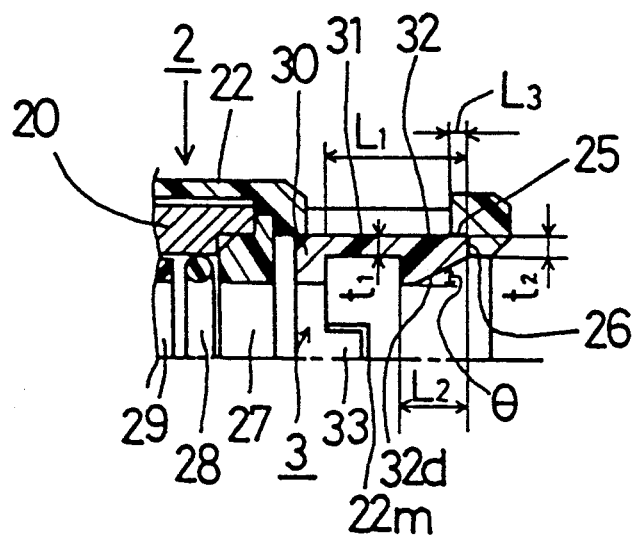
FIG. 22 is a longitudinal cross sectional view which illustrates a major portion of a female member of an Eleventh Preferred Embodiment of the present quick connector.

FIG. 22, the dimensions of the arms 31 and the claws 32 of the engager claw member 3 of the First Preferred Embodiment of the present quick connector are therefore adjusted as set forth in Table 1 below in order to optimize the insertability and the removability. For instance, as illustrated in FIG. 22, the the following dimensions, e.g., the length "$L_1$" of the arm 31, the thickness "$t_1$" of the arm 31, the length "$L_2$" of the claw 32, the superimposing length "$L_3$" of the regulatory inner peripheral surface 25 of the first socket 22 and the claw 32 in the axial direction, the superimposing thickness "$t_2$" of the stopper surface 26 of the first socket 22 and the claw 32 in the radial direction, and the angle "$\theta$" of the tapered surface 32d of the claw 32 with respect to the axial center line of the first socket 22, are adjusted as set forth in Table 1 below in order to optimize the insertability of the male member 1 into the female member 2 and the removability of the male member 1 from the female member 2. In addition, in the Eleventh Preferred Embodiment, the first socket 22 of the female member 2 are formed of polyamide resin containing glass fibers in order to reduce the weight.

Comparative Example

In order to evaluate the insertability of the male member 1 into the female member 2 and the removability of the male member 1 from the female member 2 in the Eleventh Preferred Embodiment, a Comparative Example is prepared in which the length "$L_1$," the thickness "$t_1$," the length "$L_2$," the superimposing length "$L_3$," the superimposing thickness "$t_2$," and the angle "$\theta$" are changed as set forth in Table 1 below, respectively. Other than these dimensional changes, the Comparative Example has the same construction as that of the Eleventh Preferred Embodiment as illustrated in FIG. 22.

Evaluation

The inserting load required for inserting the male member 1 into the female member 2 and the removing load required for removing the male member 1 from the female member 2 were measured actually for the Eleventh Preferred Embodiment of the present quick connector as illustrated in FIG. 22 and the Comparative Example of the quick connector, respectively, and they were evaluated for comparison. The results were obtained as set forth in Table 1 below.

TABLE 1

| Dimensions of Arm 31 and Claw 32 | Eleventh Pref. Embodiment | Comp. Ex. | Preferable Dimensions |
|---|---|---|---|
| $L_1$ (mm) | 7.7 | 6.0 | 3.0 mm or more |
| $t_1$ (mm) | 1.1 | 1.0 | 2.0 mm or less |
| $L_2$ (mm) | 3.7 | 2.0 | 2.5 mm or more |
| $L_3$ (mm) | 1.0 | 1.0 | 0.5 mm or more |
| $t_2$ (mm) | 0.9 | 1.0 | 0.5 mm or more |
| $\theta$ (deg.) | 30 | 50 | 45 deg. or less |
| Inserting Load (kgf) | 3.3 to 4.3 | 10.8 to 13.0 | |
| Insertability | Favorable | Unfavorable | |
| Removing Load (kgf) | 80.0 to 96.0 | 33.0 to 47.0 | |
| Removability | Favorable | Unfavorable | |

Namely, in the Eleventh Preferred Embodiment of the present quick connector as illustrated in FIG. 22, since the angle "$\theta$" of the tapered surface 32d of the claw 32 with respect to the axial center line of the first socket 22 was proper, the tapered surface 32d of the claw 32 worked effectively as a guiding surface for the ring-shaped projection 11 of the male member 1, and thereby the appropriate inserting load required for inserting the male member 1 into the female member 2, i.e., the adequate insertability, could be obtained. Further, since the length "$L_2$" of the claw 32 was proper, and thereby the appropriate removing load required for removing the male member 1 from the female member 2, i.e., the adequate removability, could be obtained.

On the other hand, in the Comparative Example of the quick connector, since the angle "$\theta$" of the tapered surface 32d of the claw 32 with respect to the axial center line of the first socket 22 was larger than the proper angle, the excessive force was applied to the ring-shaped projection 10 of the male member 1 by the claw 32 of the engager claw member 3 when the claw 32 of the engager claw member 3 got over the ring-shaped projection 10 of the male member 1, thereby the Comparative Example 1 was inferior in the insertability. Further, since the length "$L_2$" of the claw 32 was smaller than the proper length, the removing load required for removing the male member 1 from the female member 2 was small, and thereby the Comparative Example was inferior in the removability.

Twelfth Preferred Embodiment

Figure 23:
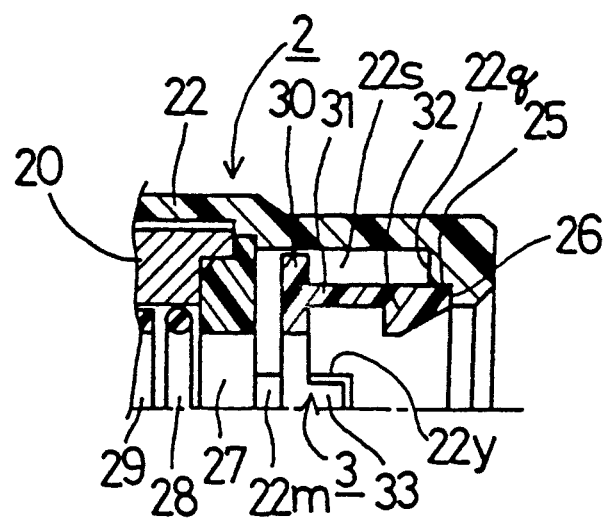
FIG. 23 is a longitudinal cross sectional view which illustrates a major portion of a female member of a Twelfth Preferred Embodiment of the present quick connector.
Figure 24:
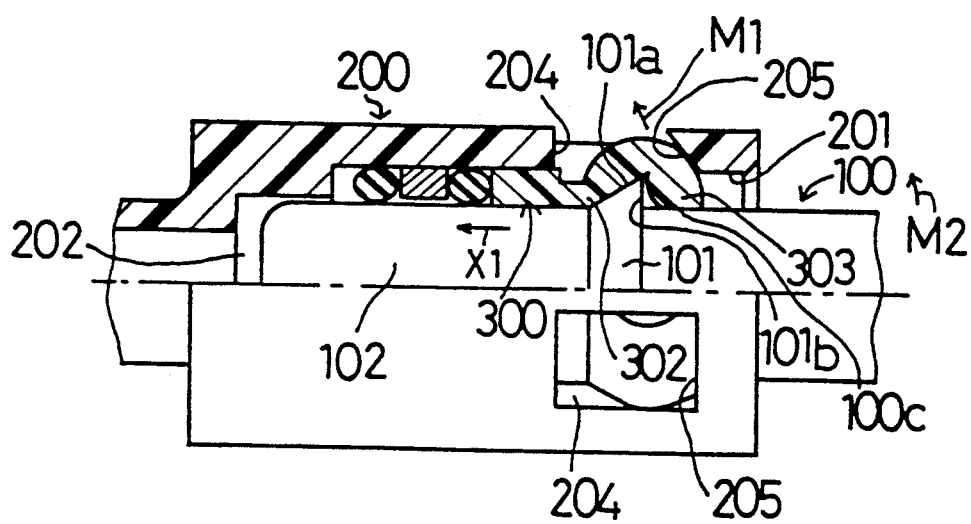
FIG. 24 is a fragmentary longitudinal cross sectional view which illustrates the conventional quick connector with the male member and the female member connected and whose upper half is illustrated in cross section.
Figure 25:
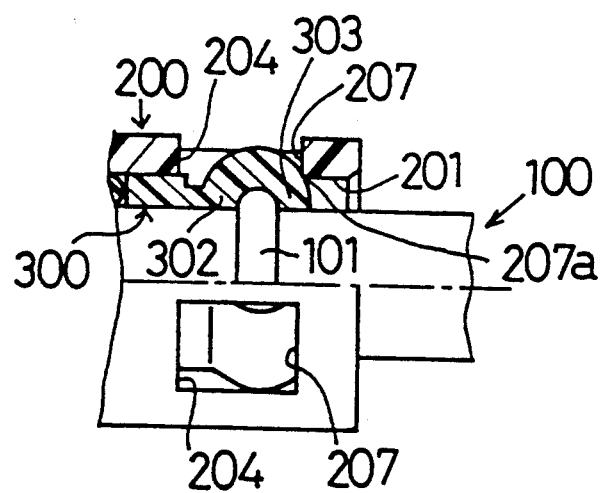
FIG. 25 is an enlarged fragmentary longitudinal cross sectional view which illustrates a major portion of the another conventional quick connector with the male member and the female member connected and whose upper half is illustrated in cross section.
Figure 26:
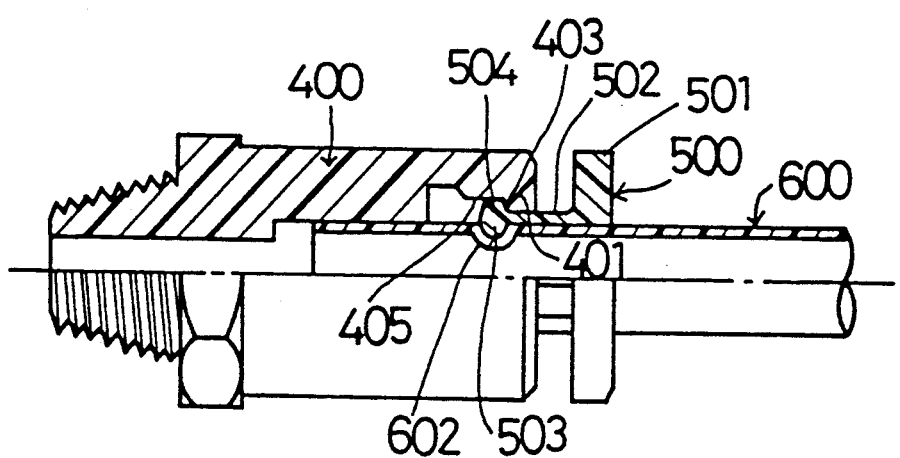
FIG. 26 is a fragmentary longitudinal cross sectional view which illustrates the still another conventional quick connector with the male member and the female member connected and whose upper half is illustrated in cross section.

The Twelfth Preferred Embodiment of the present quick connector will be hereinafter described with reference to FIG. 23. As illustrated in FIG. 23, the Twelfth Preferred Embodiment includes a first socket 22, in which a relief chamber 22s is formed, instead of the first socket 22 of the First Preferred Embodiment, in which the relief space 22r is formed in the peripheral wall. The relief chamber 22s is capable of accommodating the arms 31 and the claws 32 of the engager claw member 3 which are deformed in the centrifugal directions.

Further, in the first socket 22 of the Tenth Preferred embodiment of the present quick connector as illustrated in FIG. 20, the concaved- or grooved-engagee 22m includes the cone portion 22x which extends from the end of the receiver hole 23 to the opening 24 while reducing its width, and the rectangular portion 22y which extends in the direction with a constant width. However, in the first socket 22 of the Twelfth Preferred Embodiment of the present quick connector as illustrated in FIG. 23, the concaved- or grooved-engagee 22m includes a rectangular portion 22y which extends in the direction with a constant width only.

Furthermore, the first socket 22 of the Twelfth Preferred Embodiment of the present quick connector as illustrated in FIG. 23 includes a ring-shaped surface 22q which is disposed perpendicularly to the regulatory inner peripheral surface 25 in the radial direction and which is formed concentrically with the stopper surface 26. It is preferable that the inside diameter dimension of the ring-shaped surface 22q is larger than the outside diameter dimension of the ring-shaped base 30 of the engager claw member 3 by 3 mm or more.

Moreover, in the Twelfth Preferred Embodiment of the present quick connector as illustrated in FIG. 23, each of the arms 31 of the engager claw member 3 is disposed at an inner position which is radially inside the periphery of the ring-shaped base 30 by a predetermined distance. Accordingly, when inserting the male member 1 into the female member 2 and when removing the male member 1 from the female member 2, the arms 31 and the claws 32 of the engager claw member 3 which are deformed in the centrifugal directions are accommodated in the relief chamber 22s which is constituted by the peripheral wall and the ring-shaped surface 22q of the first socket 22 and the ring-shaped base 30 of the engager claw member 3.

The Twelfth Preferred Embodiment of the present quick connector, which is provided with the first socket 22 having the relief chamber 22s as illustrated in FIG. 23, is slightly inappropriate to satisfy the down-size requirement for the first socket 22. However, since the engager claw member 3 is not exposed to the outside at all, external shocks are not applied to the engager claw member 3 directly. As a result, there is no fear that the engagement between the male member 1 and the female member 2 is disengaged by the external shocks accidentally.

Having now fully described the present invention, it will be apparent to one of ordinary skill in the art that many changes and modifications can be made thereto without departing from the spirit or scope of the present invention as set forth herein including the appended claims.

What is claimed is:

1. A quick connector, comprising:
    a tubular-shaped male member including an inserting end portion having a leading end and a ring-shaped engager located at a rear portion of the leading end of the tubular-shaped male member;
    a tubular-shaped female member including a receiver hole having an opening into which said inserting end portion and said ring-shaped engager of said male member are inserted, a ring-shaped stopper surface located opposite to the opening, and an inner peripheral surface extending in an axial direction parallel to an axis of the tubular-shaped female member, the ring-shaped stopper surface and the inner peripheral surface defining the receiver hole and formed in a progressive order in a direction extending away from the opening; and
    an engager claw member disposed in said receiver hole of said female member, and including a ring-shaped base disposed movably in an axial direction by the tubular male member and intervening between the inner peripheral surface constituting said receiver hole of said female member and an outer peripheral surface of said inserting end portion of said male member inserted into said receiver hole, a plurality of arms extending from the base to said opening in an axial direction of said female member substantially and being elastically deformable in a radial direction, and a claw disposed so as to extend from each of the arms for engaging with said ring-shaped engager of said male member, said claw including an outer peripheral surface extending in a direction parallel to said inner peripheral surface of said female member and having an outside diameter substantially equal to an inside diameter of said inner peripheral surface of said female member;
    wherein said claws of said engager claw member are pressed onto said ring-shaped stopper surface of said female member by moving said engager claw member to said opening of said female member in said axial direction of said female member while regulating radial movements of said claws of said engager claw member with said inner peripheral surface of said female member, thereby engaging said claws of said engager claw member with said ring-shaped engager of said inserting end portion of said male member.

2. The quick connector according to claim 1, wherein said female member further includes a second inner peripheral surface having an inside diameter larger than an outside diameter of said inserting end portion of said male member, an engaging inner peripheral surface having an inside diameter substantially equal to an outside diameter of said leading end of said male member, and a member disposed between the second inner peripheral surface and an outer peripheral surface of said inserting end portion of said male member.

3. The quick connector according to claim 1, wherein said female member further includes a relief space adapted for permitting said arms and said claws of said engager claw member to deform in radial directions.

4. The quick connector according to claim 3, wherein said relief space is formed so as to penetrate through a peripheral wall of said female member.

5. The quick connector according to claim 1, wherein said female member further includes an urging member adapted for urging said engager claw member towards said opening said female member.

6. The quick connector according to claim 1, wherein said female member further includes an urging member adapted for urging said leading end of said inserting end portion of said male member, which is inserted into said receiver hole of said female member, towards said opening of said female member.

7. The quick connector according to claim 1, wherein said female member includes a tubular-shaped first socket having said opening, and a tubular-shaped second socket engaging the first socket to connect the first socket with the second socket, a ring-shaped bushing held between the first socket and the second socket and having an inside diameter substantially equal to an outside diameter of said inserting end portion of said male member.

8. The quick connector according to claim 7, wherein said first socket and said second socket constituting said female member have threaded portions for detachably connecting said first socket and said second socket.

9. The quick connector according to claim 7, wherein at least one of said first socket and said second socket constituting said female member has an engager projection connecting them detachably.

10. The quick connector according to claim 7, wherein said first socket and said second socket constituting said female member are integrated through melting.

11. The quick connector according to claim 1, wherein said ring-shaped engager of said male member is formed in a convexed shape for engagement with said engager claw member.

12. The quick connector according to claim 1, wherein said male member is formed of a metallic pipe, and said ring-shaped engager is formed in a convexed shape by partially increasing a diameter of a peripheral wall of the metallic pipe.

13. The quick connector according to claim 1, wherein said ring-shaped engager of said male member is formed in a concaved shape for engagement with said engager claw member.

14. The quick connector according to claim 1, wherein said leading end portion of said male member has a cone-shaped guiding portion disposed at the leading end thereof and having an outside diameter reducing toward the leading end.

15. The quick connector according to claim 1, wherein each of said claws of said engager claw member has a tapered surface having an inside diameter increasing toward a free end thereof.

16. The quick connector according to claim 1, wherein each of said claws of said engager claw member has a contact surface facing said ring-shaped stopper surface of said female member and extending in a direction substantially perpendicular to said axial direction, and a head surface facing said inner peripheral surface of said female member and extending substantially in said axial direction.

17. The quick connector according to claim 1, wherein said engager claw member has an engager member formed in one of a concaved shape and a convexed shape, said receiver hole of said female member has an engaging member adapted for being engaged with the engager member and formed in one of a convexed shape and a concaved shape, and relative movements of said female member and said male member in a circumferential direction are regulated by engaging the engager member with the engaging member.

18. The quick connector according to claim 1, wherein said base of said engager claw member has a projection approaching to said ring-shaped engager of said male member and regulating relative movements of said male member and said engager claw member in said axial direction of said female member.

19. The quick connector according to claim 1, wherein each of said arms has a bendable portion adapted for bending in a radial direction at the fixed end.

20. The quick connector according to claim 1, wherein said base of said engager claw member has an outside diameter substantially equal to an inner peripheral surface constituting said receiver hole of said female member, and said engager claw member slides on the inner peripheral surface constituting said receiver hole of said female member.

21. The quick connector according to claim 1, wherein each of said male member, said female member and said engager claw member is formed of at least one selected from the group consisting of metal, resin and fiber reinforced resin.

22. A quick connector, comprising:
a tubular-shaped male member including an inserting end portion having a leading end and a ring-shaped engager located at a rear portion of the leading end of the tubular-shaped male member;
a tubular-shaped female member including a receiver hole having an opening into which said inserting end portion and said ring-shaped engager of said male member are inserted, a ring-shaped stopper surface located opposite to the opening, and an inner peripheral surface extending in an axial direction parallel to an axis of the tubular-shaped female member, the ring-shaped stopper surface and the inner peripheral surface defining the receiver hole and formed in a progressive order in a direction extending away from the opening;
an engager claw member disposed in said receiver hole of said female member, and including a ring-shaped base disposed movably in an axial direction by the tubular male member and intervening between the inner peripheral surface constituting said receiver hole of said female member and an outer peripheral surface of said inserting end portion of said male member inserted into said receiver hole, a plurality of arms extending from the base to said opening in an axial direction of said female member substantially and being elastically deformable in a radial direction, and a claw disposed so as to extend from each of the arms for engaging with said ring-shaped engager of said male member; and
a claw disengaging means adapted for being inserted into said opening of said female member and being brought into contact with said claws of said engager claw member, thereby displacing said arms and said claws of said engager claw member radially outwardly;
wherein said claws of said engager claw member are pressed onto said ring-shaped stopper surface of said female member by moving said engager claw member to said opening of said female member in said axial direction of said female member while regulating radial movements of said claws of said engager claw member with said inner peripheral surface of said female member, thereby engaging said claws of said engager claw member with said ring-shaped engager of said inserting end portion of said male member; and
said claw disengaging means is inserted into said opening of said female member and is brought into contact with said claws of said engager claw member so as to displace said arms and said claws of said engager claw member radially outwardly, thereby disengaging said claws of said engager claw member from said ring-shaped engager of said male member.

23. The quick connector according to claim 22, wherein said claw disengaging means includes a tubular portion having a central hole into which said inserting end portion of said male member is inserted, and a tapered contact surface adapted for being inserted into said receiver hole of said female member through said opening, adapted for being brought into contact with said claws of said engager claw member when inserted and having an outside diameter reducing toward the leading end.

* * * * *